Dec. 17, 1957     T. E. HAYES     2,816,439
PRODUCE HARDNESS TESTER
Filed April 6, 1955
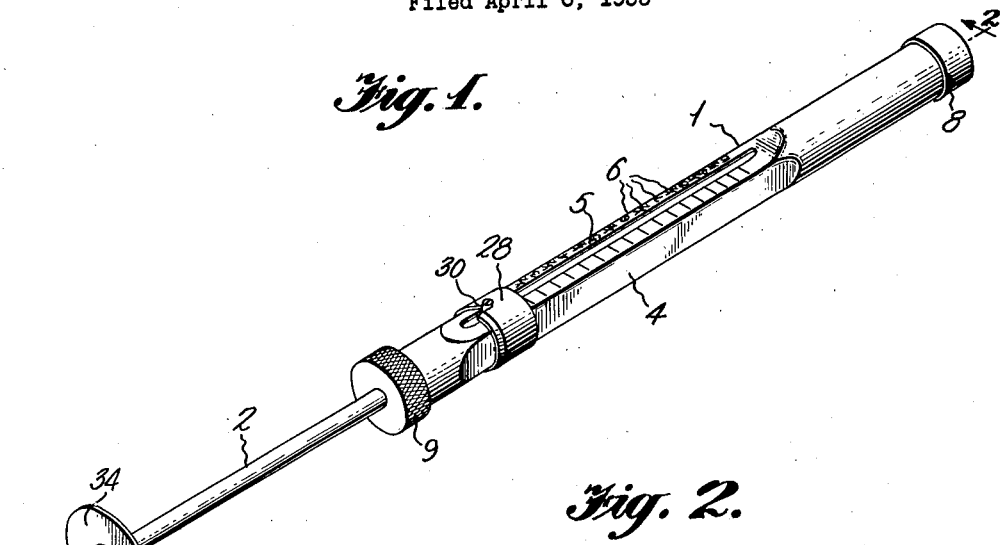
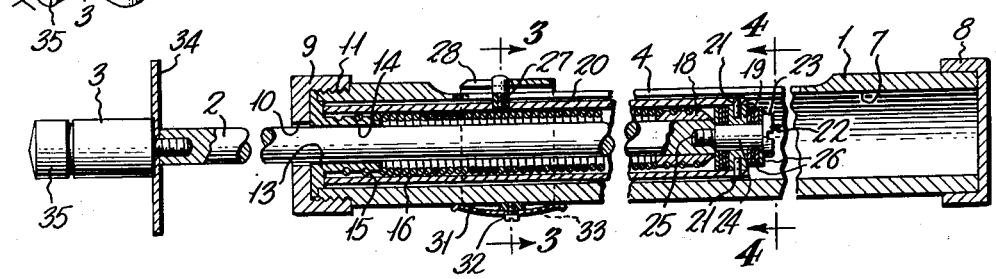
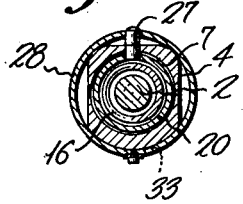
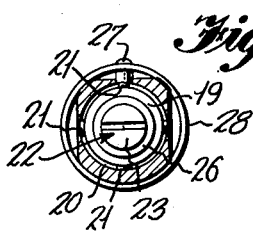
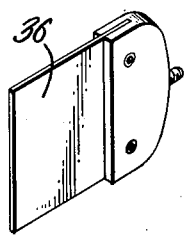
INVENTOR
*Thomas E. Hayes*
BY *Mason, Fenwick & Lawrence*
ATTORNEYS

United States Patent Office 2,816,439
Patented Dec. 17, 1957

2,816,439

PRODUCE HARDNESS TESTER

Thomas E. Hayes, Washington, D. C.

Application April 6, 1955, Serial No. 499,684

2 Claims. (Cl. 73—81)

This invention relates to fruit and vegetable testers of the type having a plunger to be inserted in the fruits or vegetables to indicate the relative firmness of the tested produce.

Instruments of the general nature of the present invention have been in use for some time. They are used to determine the ripeness of fruit and vegetables and to learn its quality after storage. Such instruments have been found to give very accurate results when new. As the pressure reading is obtained by compression of a spring, the indicator usually will not return to a zero setting after considerable use. When the spring has been stretched so that it will not zero the indicator it becomes impossible to get accurate readings. Thus, the instrument loses its utility long before it is worn out.

The principal object of the present invention is to provide a tester of this type having means to compensate for spring stretch so that the indicator can be reset to zero position.

A more specific object is to provide means to shift the plunger rod relative to the barrel to compensate for spring stretch.

Other objects of the invention will become apparent from the following description of one particular embodiment thereof when taken in conjunction with the drawings which accompany, and form part of, this specification.

In the drawings:

Figure 1 is a perspective view of a tester embodying the principles of the present invention;

Figure 2 is a longitudinal view through the tester, taken on the line 2—2 of Figure 1;

Figure 3 is a transverse section through the device taken on the line 3—3 of Figure 2;

Figure 4 is a transverse section taken on the line 4—4 of Figure 2; and

Figure 5 is a perspective view of a testing blade to be used with the device.

Referring to the drawings in detail, there is shown a fruit and vegetable tester having a casing 1, a plunger 2 slideable in the casing, and a testing tip 3 connected to the end of the plunger.

The casing is illustrated as having cylindrical ends and a squared mid-section 4. The non-round cross-section of the central part enables the user to obtain a firm grip on the instrument and, at the same time, provides a flat face 5 which can be marked with a scale 6 to indicate in pounds the pressure required for the plunger tip to penetrate the produce a predetermined distance. The casing has a cylindrical bore 7 through its full length, and its ends are closed by the caps 8 and 9. Cap 8 is closed, and cap 9 has a central opening 10 to permit passage of the plunger.

The cap 9 is threaded on the end of the casing, as at 11, and the flange 12 of a thimble 13 is clamped between the cap and the end of the casing. The thimble has a bore 14 through which the plunger is freely movable. A spiral groove 15 is formed on the body of the thimble to screw into the end of a tension spring 16 and be locked thereto.

The spring surrounds the plunger and has its opposite end threaded into a spiral groove 17 of a second thimble 18 which is fixed to the inner end of the plunger rod. It will be evident that when the plunger tip is placed against an object and the casing pushed forward, the casing will slide on the plunger and the spring will be expanded.

Plunger 2 has a disk 19 connected to its end to support a spring housing 20. The housing is secured to the disk by means of several pins 21. The disk is fastened to the plunger by means of a screw 22 which has a head 23, a reduced diameter shank 24 and a still smaller threaded stud 25. The shank is considerably longer than the thickness of the disk 19, leaving ample space on the shank for a plurality of shims 26. The shims may be placed on one, or both, sides of the disk, as needed, and their arrangement will determine the longitudinal position of the spring housing with respect to the plunger. Ordinarily, when the spring is new, the end of the spring housing will abut the flange 12 of thimble 13. As the spring is stretched, the housing will not contact the flange when pressure is released. By moving some of the shims from between the end of the plunger and disk and placing them between the disk and screw head, the housing will be moved back to again contact the flange.

The housing 20 carries an indicator actuating pin 27 which slides in a slot 28 in the flat face 5 of the casing. An indicator 29, which is in the form of a sleeve which encircles and slides on the casing, has a slot 30 into which the pin fits to remove the indicator up the scale. The indicator is held in the position to which it is moved by means of a leaf spring 31 attached to the bottom of the indicator by a screw 32. The edges of the indicator are notched, as at 33, to permit the ends of the leaf spring to bear against the casing.

The testing tip is threaded onto the end of the plunger, and a splash guard 34 is interposed between the tip and the plunger. The tip has a reduced diameter threaded stud 35 to thread into the plunger and the splash guard slips over the stud so that it will be held tightly between the tip and plunger end.

The tips may be of several forms depending upon the produce to be tested. The tip shown in Figures 1 and 2 is cylindrical to perforate fruit and vegetables such as peaches, apples, tomatoes, etc. In Figure 5 there is shown a blade type tip 36 such as is used for asparagus and similar vegetables.

It is believed that the operation of the device will be clear from the above description without further discussion. The principal feature to be borne in mind is the arrangement of the plunger and spring housing with the shims to permit shifting the housing relative to the plunger position.

While in the above one practical embodiment of the invention has been disclosed, it will be understood that the details of construction shown and described are merely by way of illustration, and the scope of the invention is to be limited only by the appended claims.

What is claimed is:

1. In a produce tester, a casing, a plunger extending through one end of the casing and reciprocably movable therein, a coil spring surrounding said plunger within said casing having one end connected to said casing and the other end to said plunger to urge said plunger outwardly of said casing, a spring housing having one closed end and one open end surrounding said spring and coaxial with said plunger, a stud through the closed end of said housing and extending axially into the end of said plunger, said stud having a head and a shank with said shank being of greater length than the thickness of the end of the spring housing through which it passes, and shims arranged on the shank of said stud in preselected order between said plunger end and said end of said spring housing and between the end of said spring housing and said stud head.

2. In a produce tester, a casing, a plunger extending through one end of the casing and reciprocably movable therein, a spring having one end connected to the casing and the other end to said plunger to urge the plunger outwardly of said casing, a spring housing surrounding said spring and connected to said plunger, an indicator actuating pin carried by said spring housing, said casing having a slot therein through which said pin projects and a scale along said slot, and means at the connection between said spring housing and plunger to permit axial shifting of the spring housing relative to said plunger to compensate for spring stretch, said connection between said spring housing and the plunger comprising a stud passing through said spring housing and axially into said plunger, said stud having a head and a shank of greater length than the thickness of the spring housing wall through which it passes, and shims arranged on the shank of said stud in preselected order between said plunger end and spring housing and between said spring housing and said stud head.

References Cited in the file of this patent
UNITED STATES PATENTS

| | | |
|---|---|---|
| 1,260,869 | Carlson | Mar. 26, 1918 |
| 1,942,982 | Schneider | Jan. 9, 1934 |